(12) United States Patent
Venkatesh et al.

(10) Patent No.: US 12,250,211 B2
(45) Date of Patent: Mar. 11, 2025

(54) LOGGING IN TO MODERN WORKSPACES USING DIFFERENT CLOUD IDENTITY PROVIDERS AND SINGLE SIGN-ON

(71) Applicant: Dell Products L.P., Round Rock, TX (US)

(72) Inventors: Ramanujam Kaniyar Venkatesh, Bangalore (IN); Sudhakar Ramasamy, Salem (IN); Jyothi Bandakka, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 279 days.

(21) Appl. No.: 18/047,971

(22) Filed: Oct. 19, 2022

(65) Prior Publication Data

US 2024/0137361 A1 Apr. 25, 2024
US 2024/0236078 A9 Jul. 11, 2024

(51) Int. Cl.
*G06F 21/31* (2013.01)
*H04L 9/40* (2022.01)
*H04W 12/06* (2021.01)

(52) U.S. Cl.
CPC ........ *H04L 63/083* (2013.01); *H04L 63/0815* (2013.01); *H04L 63/0884* (2013.01)

(58) Field of Classification Search
None
See application file for complete search history.

(56) References Cited

U.S. PATENT DOCUMENTS

| | | | |
|---|---|---|---|
| 2011/0209204 A1* | 8/2011 | Jacobs | H04L 9/40 726/4 |
| 2014/0013409 A1* | 1/2014 | Halageri | H04L 63/0815 726/8 |
| 2015/0229723 A1* | 8/2015 | Bosman | H04L 67/1097 707/784 |
| 2016/0094543 A1* | 3/2016 | Innes | H04L 63/0823 726/6 |
| 2016/0330177 A1* | 11/2016 | Singleton, IV | H04L 63/083 |
| 2017/0048252 A1* | 2/2017 | Straub | H04L 67/02 |
| 2017/0346797 A1* | 11/2017 | Yedidi | H04L 63/14 |
| 2020/0374121 A1* | 11/2020 | Momchilov | H04L 9/0825 |
| 2022/0070160 A1* | 3/2022 | Cicchitto | H04W 12/069 |
| 2022/0311626 A1* | 9/2022 | Gundavelli | H04L 9/0894 |

* cited by examiner

*Primary Examiner* — Christopher B Robinson
(74) *Attorney, Agent, or Firm* — Kirton McConkie; Brian Tucker

(57) ABSTRACT

Users can be logged in to modern workspaces using different cloud identity providers and single sign-on. A login manager can be provided on a user computing device to obtain a user's login credentials via a custom login screen. The login manager can then inject the login credentials into an authentication interface of a cloud identity provider to authenticate the user for purposes of logging in to the user computing device. The login manager can leverage this authentication to perform single sign-on for all resources of a modern workspace such that the user can be logged in to the modern workspace via any cloud identity provider.

20 Claims, 10 Drawing Sheets

LOGGING IN TO MODERN WORKSPACES USING DIFFERENT CLOUD IDENTITY PROVIDERS AND SINGLE SIGN-ON

CROSS-REFERENCE TO RELATED APPLICATIONS

N/A

BACKGROUND

In the context of this application, a modern workspace refers to an environment provided on a user computing device in which the user can seamlessly access applications and data available across public and/or private clouds and locally. For example, a modern workspace may allow a user to seamlessly access a variety of cloud solutions (e.g., Microsoft 365, Google Workspace, Remote Desktop, etc.) from his or her desktop, laptop, smart phone, etc. leveraging a variety of cloud identity providers (e.g., Azure Active Directory, Google Cloud Identity, Okta, PingIdentity, etc.).

When a modern workspace is implemented on a user computing device, the user will still need to log in to the user computing device. If the user computing device is running a version of Windows, the user may be able to log in via Azure Active Directory but not via any other cloud identity provider. Likewise, if the user computing device is running a version of Chrome OS, the user may be able to log in via Google Cloud Identity but not via any other cloud identity provider. If the user computing device is running another operating system such as Linux or FreeBSD, there may not be an option to log in via a cloud identity provider.

Once the user is logged in to the user computing device, the user will still typically need to log in to gain access to the resources of the modern workspace and such login typically involves multiple cloud identity providers. For example, if the modern workspace includes Microsoft 365 and Google Workspace, the user may need to authenticate with Azure Active Directory and Google Cloud Identity to login to the modern workspace (i.e., to gain access to all the resources that the modern workspace provides).

To be able to login to multiple cloud identity providers, the user computing device must typically be joined to a domain host in an on-premises active directory to interface with an on-premises domain controller. Once joined, the user computing device may leverage the domain controller to perform single sign-on with the various cloud identity providers. For this reason, an enterprise that desires to provide modern workspaces to its users (e.g., employees) must invest in physical hardware to run Windows Server Active Directory and domain controllers on-premises and must employ an administrator with knowledge to setup and maintain such resources.

BRIEF SUMMARY

The present invention extends to systems, methods and computer program products for logging in to modern workspaces using different cloud identity providers and single sign-on. A login manager can be provided on a user computing device to obtain a user's login credentials via a custom login screen. The login manager can then inject the login credentials into an authentication interface of a cloud identity provider to authenticate the user for purposes of logging in to the user computing device. The login manager can leverage this authentication to perform single sign-on for all resources of a modern workspace such that the user can be logged in to the modern workspace via any cloud identity provider.

In some embodiments, the present invention may be implemented as a method for logging in to modern workspaces using different cloud identity providers and single sign-on. A login manager can detect that a user is attempting to log in to a user computing device and can present a custom login screen to the user. The login manager can receive login credentials via the custom login screen and then inject the login credentials into an authentication interface of a cloud identity provider to thereby authenticate the user via the cloud identity provider using the login credentials received via the custom login screen. In response to authenticating the user, a modern workspace can be presented to the user on the user computing device.

In some embodiments, the present invention may be implemented as computer storage media storing computer executable instructions which when executed implement a method for logging in to modern workspaces using different cloud identity providers and single sign-on. A login manager on a first user computing device can receive first login configurations. In response to a first user's attempt to log in to the first user computing device, a first custom login screen can be presented to the first user. Login credentials for the first user can be received via the first custom login screen. A first authentication interface of a first cloud identity provider can be selected based on the first login configurations. The login credentials for the first user can be injected into the first authentication interface to thereby authenticate the first user via the first cloud identity provider using the login credentials for the first user received via the first custom login screen. In response to authenticating the first user, a first modern workspace can be presented to the first user on the first user computing device. A login manager on a second user computing device can receive second login configurations. In response to a second user's attempt to log in to the second user computing device, a second custom login screen can be presented to the second user. Login credentials for the second user can be received via the second custom login screen. A second authentication interface of a second cloud identity provider can be selected based on the second login configurations, the second cloud identity provider being different from the first cloud identity provider. The login credentials for the second user can be injected into the second authentication interface to thereby authenticate the second user via the second cloud identity provider using the login credentials for the second user received via the second custom login screen. In response to authenticating the second user, a second modern workspace can be presented to the second user on the second user computing device.

In some embodiments, the present invention may be implemented as user computing device that includes one or more processors and computer storage media storing computer executable instructions which when executed implement a login manager that is configured to perform a method for logging a user into a modern workspace using a cloud identity provider and single sign-on. The login manager can detect that the user is attempting to log in to the user computing device. The login manager can present a custom login screen to the user. The login manager can receive login credentials via the custom login screen. The login manager can inject the login credentials into an authentication interface of a cloud identity provider to thereby authenticate the user via the cloud identity provider using the login credentials received via the custom login screen. In response to authenticating the user, the login manager can cause a modern workspace to be presented to the user on the user computing device.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
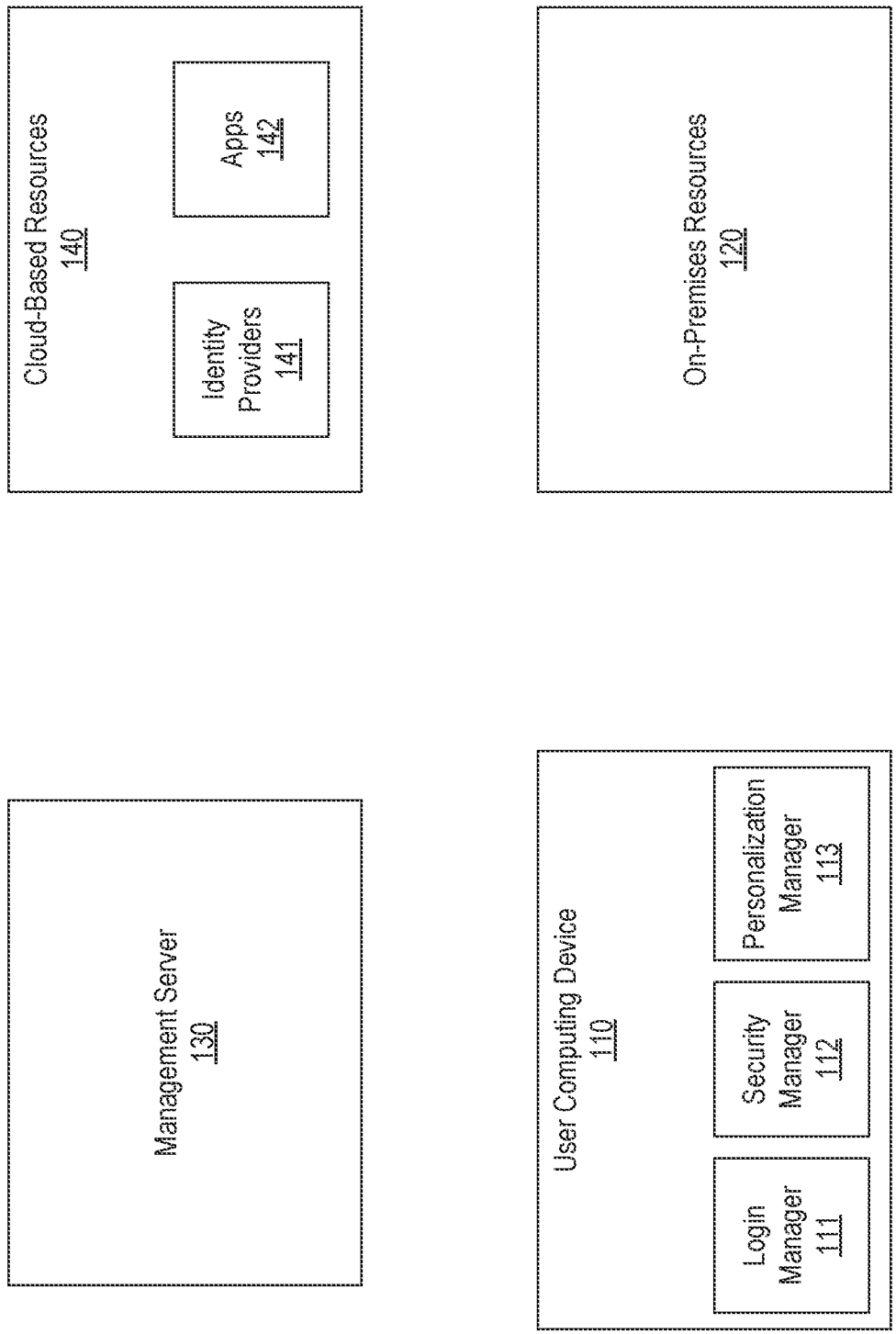
FIG. 1 provides an example of a computing environment in which embodiments of the present invention may be implemented.

FIG. 1 provides an example of a computing environment in which one or more embodiments of the present invention may be implemented. This computing environment includes one or more user computing devices 110, on-premises resources 120, a management server 130, and cloud resources 140. Each user computing device 110 could be a desktop, laptop, thin client, tablet, smart phone, or any other computing device that a user may use to access a modern workspace.

On-premises resources 120, which may not be provided in all embodiments, could include any resources that are provided on-premises including on a local cloud. In some embodiments, on-premises resources 120 could include an enterprise's locally maintained data and processes (an enterprise's production servers, production data, storefront, etc.) and local resources for accessing cloud resources 140 (e.g., Virtual Desktop Access, Cloud Connectors, etc.). Of primary relevance to embodiments of the present invention, on-premises resources 120 could include resources for which a user of user computing device 110 must authenticate to gain access.

Management server 130 can represent any management solution that is used to manage user computing devices 110. As one example only, management server 130 could represent the Dell Wyse Management Suite. Of primary relevance to embodiments of the present invention, management server 130 can be configured to manage and deploy modern workspaces to user computing devices 110.

Cloud resources 140 can represent any resources that are provided in the cloud and made available as part of a modern workspace. Cloud resources 140 can include cloud identity providers 141 and cloud applications 142. For example, cloud applications 142 could represent the various applications that are part of Microsoft 365 or Google Workspace or any application that is made accessible via Remote Desktop, Citrix, VMWare View, or any other virtual desktop infrastructure.

Each user computing device 110 may include a login manager 111, a security manager 112, and a personalization manager 113. Login manager 111 can represent one or more services or other components that implement the functionality described herein to log in to a modern workspace using different cloud identity providers and single sign-on. Security manager 112 can represent one or more services or other components that securely store and manage data on user computing device 110 including authentication details such as tokens. For example, security manager 112 could include the Trust Platform Module on user computing device running Windows and the Lockbox utility on user computing devices using the VMware Smart Assurance solution. Personalization manager 113 can represent one or more services or other components that personalize a modern workspace for the user of user computing device 110. For example, personalization manager 113 can manage a file system (e.g., ZFS) that includes the data for presenting a modern workspace to the user. In some embodiments, the modern workspace may appear similar to a desktop having icons representing the various cloud applications 142 and on-premises resources 120 that the user has access to.

As an overview, embodiments of the present invention may be implemented to allow users to log in to modern workspaces using any of a variety of cloud identity providers and with single sign-on. When embodiments of the present invention are implemented, there is no need to have an on-premises directory service such as Active Directory for authentication purposes. Additionally, users can log in to modern workspaces in accordance with embodiments of the present invention from any location and on any supported user computing device.

Figure 2A:
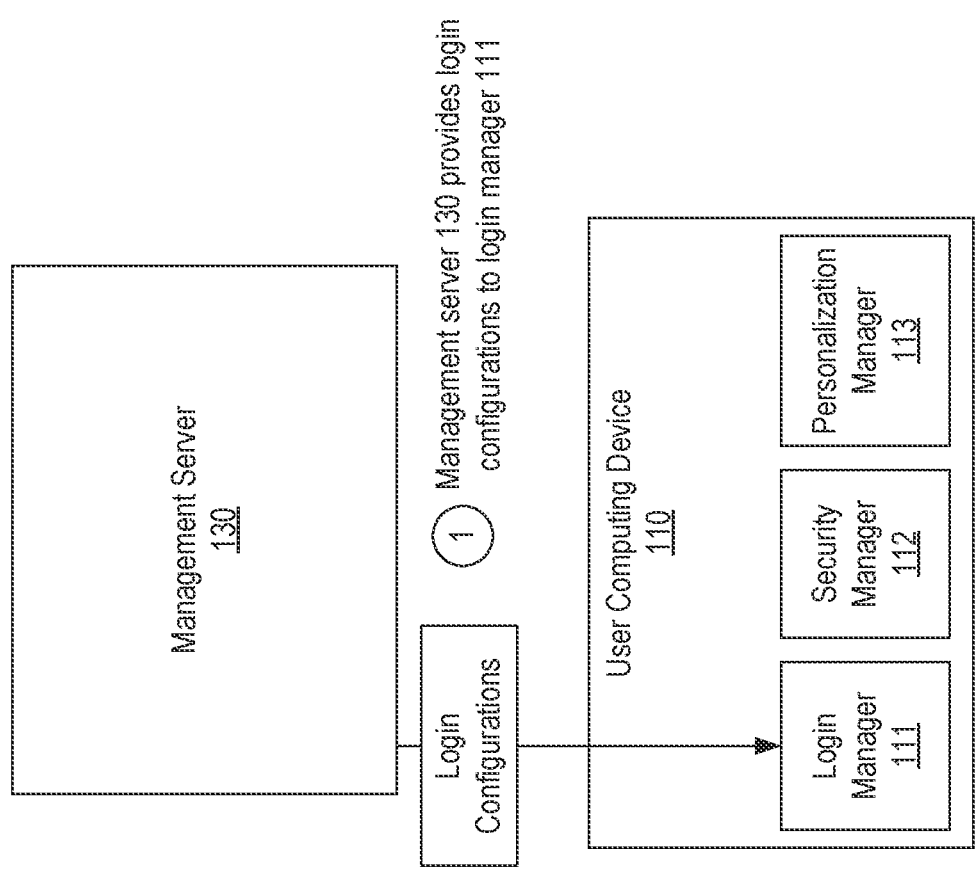
FIGS. 2A-2I provide an example of how users can log in to modern workspaces using different cloud identity providers and single sign-on in accordance with embodiments of the present invention.

FIGS. 2A-2I provide an example of how users can log in to modern workspaces using different cloud identity providers and single sign-on in accordance with embodiments of the present invention. Turning to FIG. 2A, in step 1, management server 130 can provide login configurations to login manager 111 on user computing device 110. This step could be performed at any suitable time including before user computing device 110 is provided to the user. The login configurations could include an identification of a cloud identity provider (e.g., Azure Active Directory, Google Cloud Identity, Okta, PingIdentity, etc.) that should be used to log the user of user computing device 110 into a modern workspace.

Figure 2B:
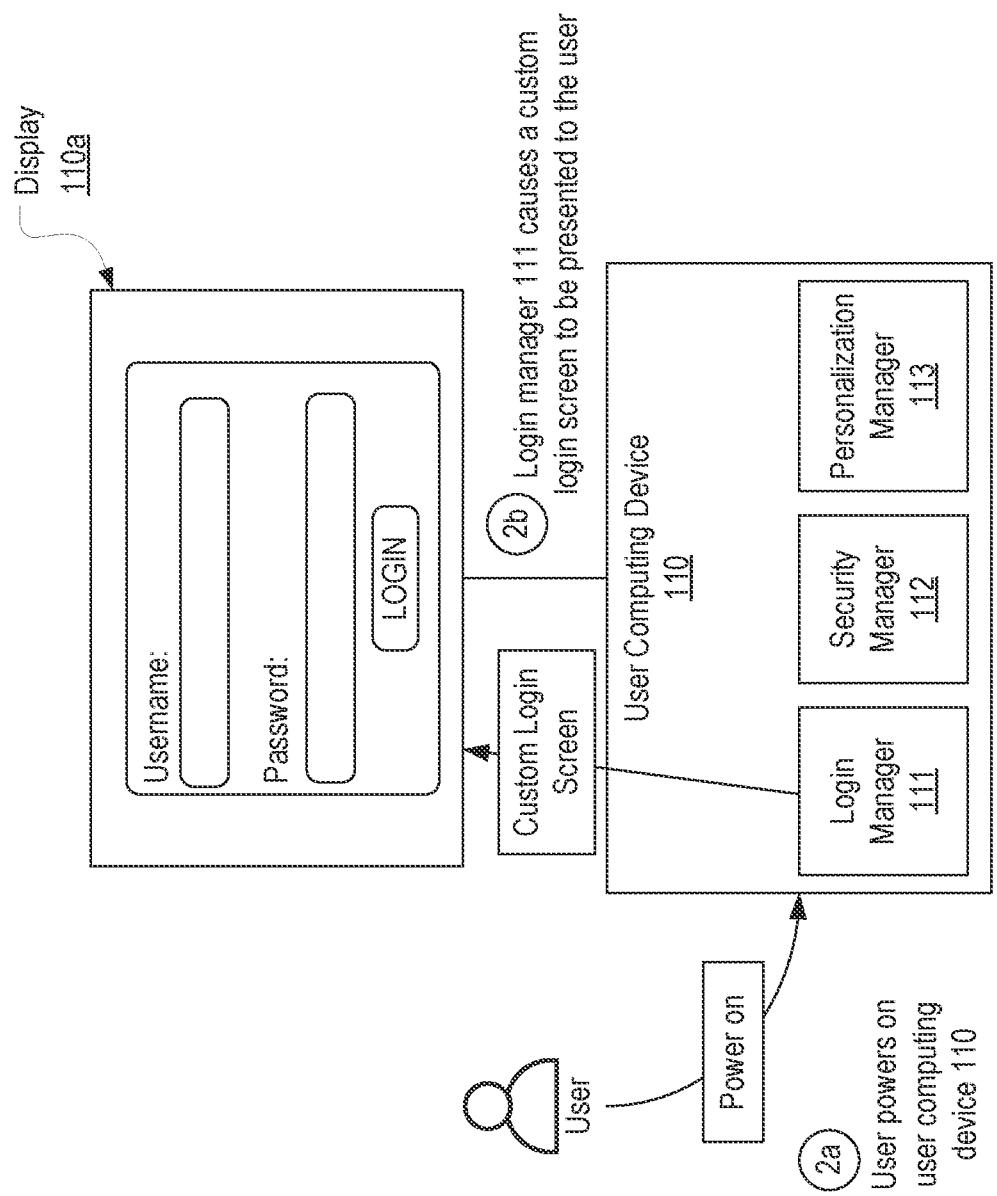

Turning to FIG. 2B, in step 2a, it is assumed that the user powers on user computing device 110 causing it to boot up. In step 2b, login manager 111 can cause a custom login screen to be presented to the user (as opposed to allowing the operating system to present the default login screen). This custom login screen can prompt the user for login credentials (e.g., a username and password) and can be configured to provide the login credentials to login manager 111 (as opposed to any authentication infrastructure of the operating system).

Figure 2C:
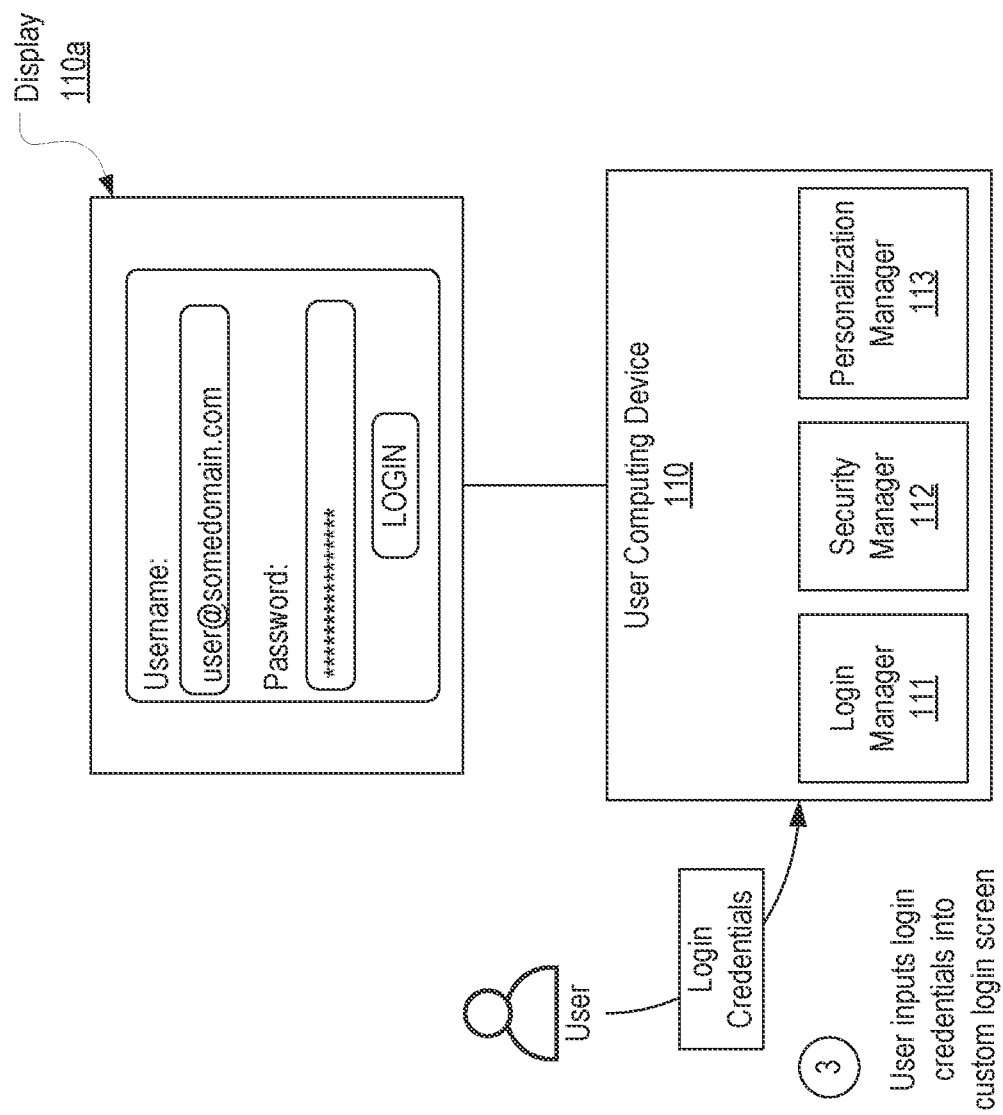

Turning to FIG. 2C, in step 3, it is assumed that the user inputs login credentials to the custom login screen. Because login manager 111 provides the custom login screen, login manager 111 receives these login credentials.

Figure 2D:
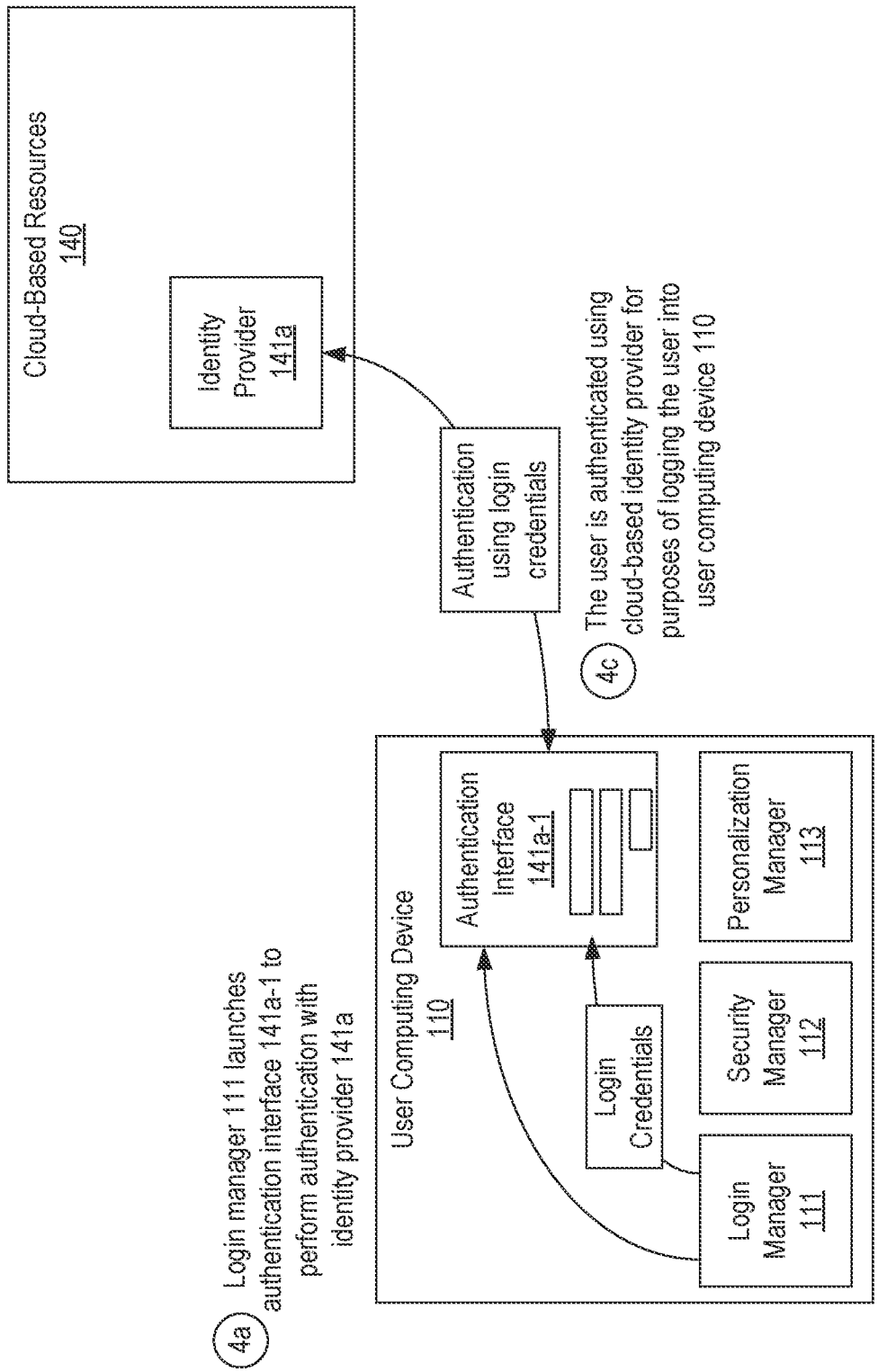

Turning to FIG. 2D, in step 4a and in response to the user inputting login credentials into the custom login screen, login manager 111 can launch an authentication interface 141a-1 pertaining to a cloud identity provider 141a to perform authentication with cloud identity provider 141a. For example, authentication interface 141a-1 could be a webapp for authenticating with Azure Active Directory, Google Cloud Identity, Okta, PingIdentity, etc. Notably, login manager 111 can select authentication interface 141a-1 based on the login configurations provided by management server 130. For example, an administrator could use management server 130 to provide login configurations that specify that the user of user computing device 110 should log in to a modern workspace using Azure Active Directory. In such a case, login manager 111 can load the webapp for authenticating with Azure Active Directory in step 4*a*.

In step 4*b*, and in conjunction with launching authentication interface 141*a*-1, login manager 111 can inject the login credentials that the user input into the custom login screen and then initiate authentication (e.g., by activating a login button). In step 4*c*, authentication interface 141*a*-1 can communicate with identity provider 141*a* to authenticate the user using the login credentials the user input into the customer login screen. This authentication can be performed for purposes of logging the user into user computing device 110 as well as to enable single sign-on to the modern workspace. In some embodiments, the authentication could be performed using OAuth 2.0, and login manager 111 could receive back one or more tokens to be used for performing single sign-on when the user accesses cloud applications 142 from the modern workspace. In such embodiments, login manager 111 could use security manager 112 to store such tokens (e.g., in a Lockbox).

Figure 2E:
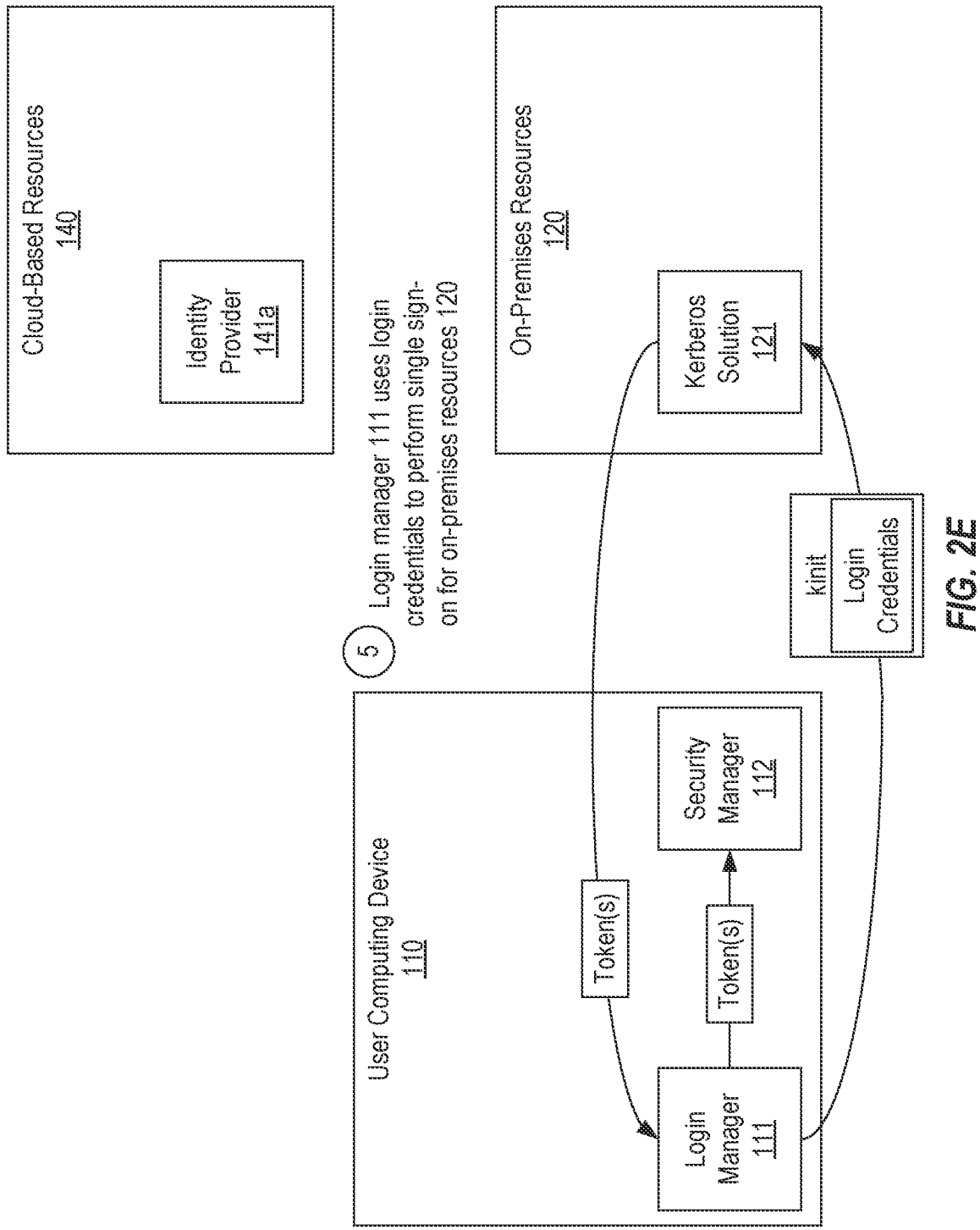

Turning to FIG. 2E, in an optional step 5, which may be performed when the modern workspace provides access to on-premises resources 120, login manager 111 may use the login credentials received via the custom login screen to perform single sign-on for any on-premises resources 120 to be made available via the modern workspace. For example, FIG. 2E represents a scenario where on-premises resources 120 include a Kerberos solution 121 and login manager 111 uses kinit to obtain one or more tokens to be used for single sign-on. Login manager 111 could store such tokens (e.g., a ticket granting ticket) with security manager 112 to be used to perform single sign-on when the user accesses on-premises resources 120 from the modern workspace.

At this point, login manager 111 will have performed the necessary authentication to log the user into user computing device 110 and to perform single sign-on for any resource (whether cloud-based or on-premises) available in the modern workspace using only the user's login credentials input to the custom login screen. Notably, login manager 111 can do so regardless of the operating system that is running on user computing device 110 and without relying on an on-premises directory service.

Figure 2F:
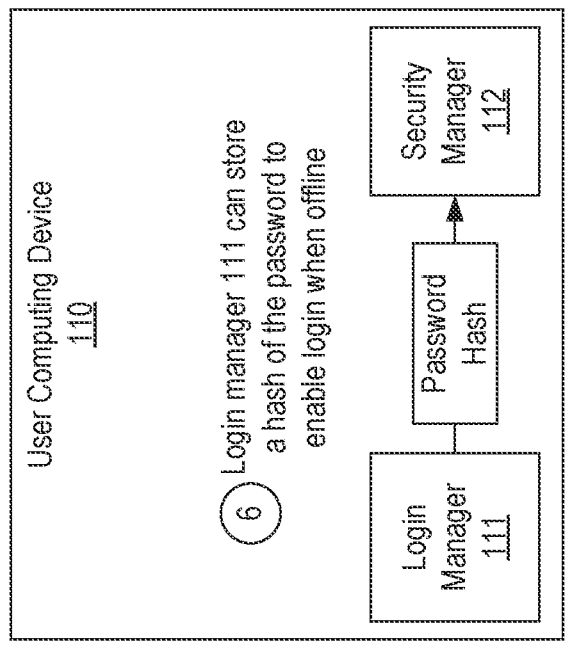

Turning to FIG. 2F, in an optional step 6, login manager 111 can store a hash of the user's password to enable the user to log in to the modern workspace when user computing device 110 is offline. For example, login manager 111 could leverage security manager 112 to store the hash of the password in association with the username in a Lockbox and secure the Lockbox using a key present in the Trust Platform Module. In such embodiments, if the user attempts to login when user computing device 110 is offline, login manager 111 can present the custom login screen to the user and then use the stored hash of the password to directly authenticate the user's credentials input to the custom login screen.

Figure 2G:
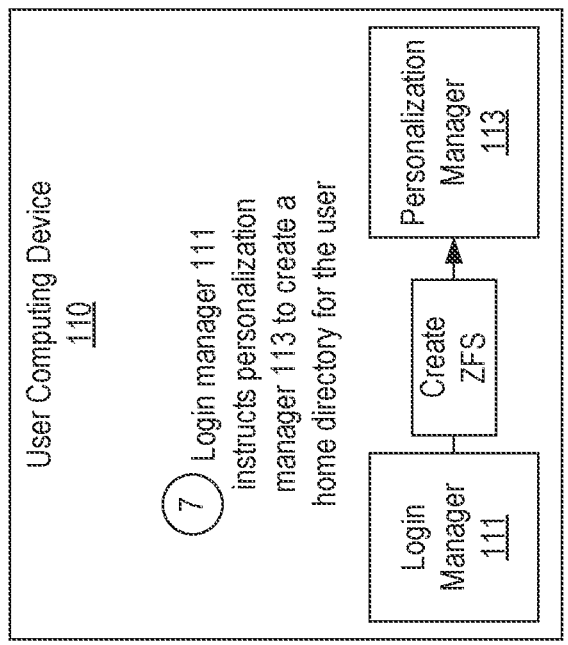

Turning to FIG. 2G, in step 7 which may be performed either when authentication is performed via a cloud identity provider or via the stored hash of the password, login manager 111 can instruct personalization manager 113 to create a home directory for the user. For example, login manager 111 could provide the username or other identifier of the user to personalization manager 113 which could then create a ZFS file system or other file system or data structure providing a home directory for the user. This home directory may include the user's local files, data, or other configurations.

Figure 2H:
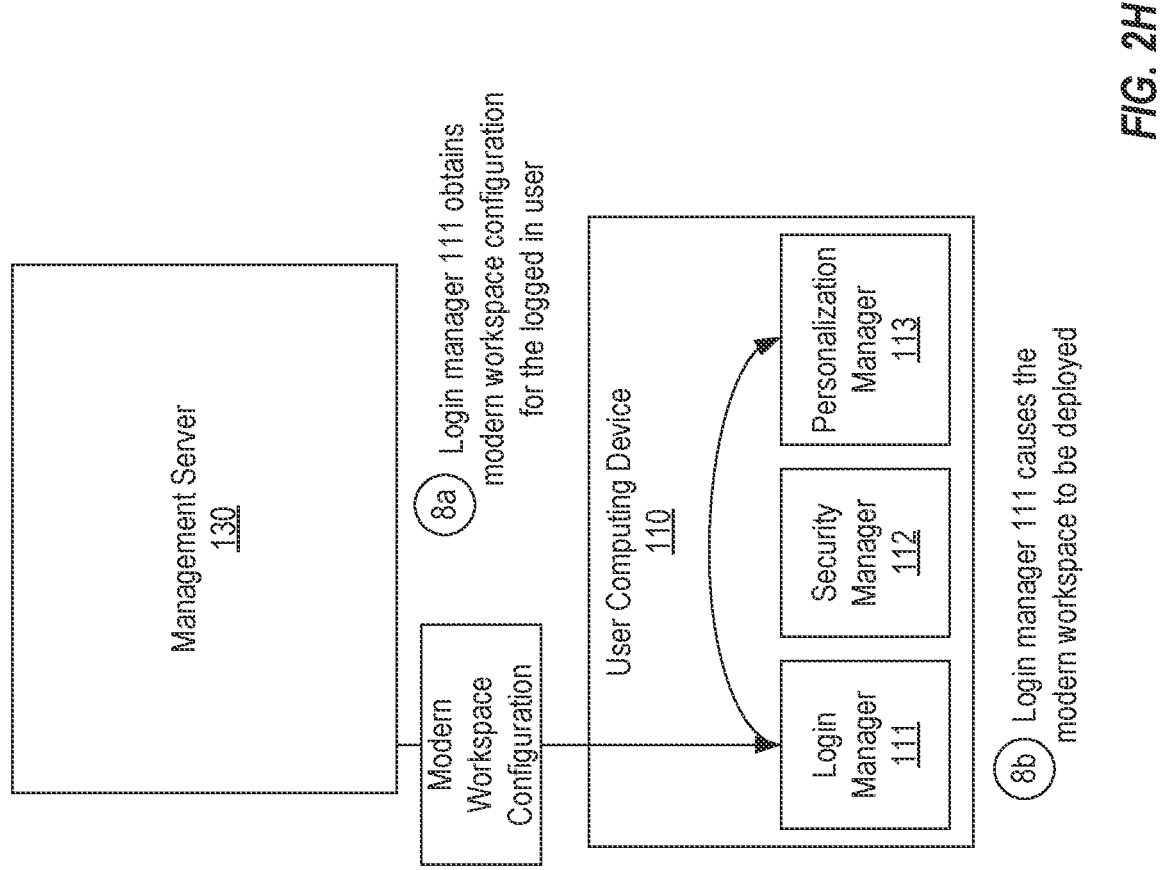

Turning to FIG. 2H, in step 8*a*, login manager 111 may obtain a modern workspace configuration for the logged in user. In some embodiments, this modern workspace configuration could be cached on user computing device 110 as opposed to being retrieved from management server 130 each time the user logs in. In any case, the modern workspace configuration can define the modern workspace for the user including which cloud applications 142 and on-premises resources 120 are to be made available to the user within the modern workspace and any associated configurations. In step 8*b*, login manager 111 can cause the modern workspace to be deployed on user computing device 110.

Figure 2I:
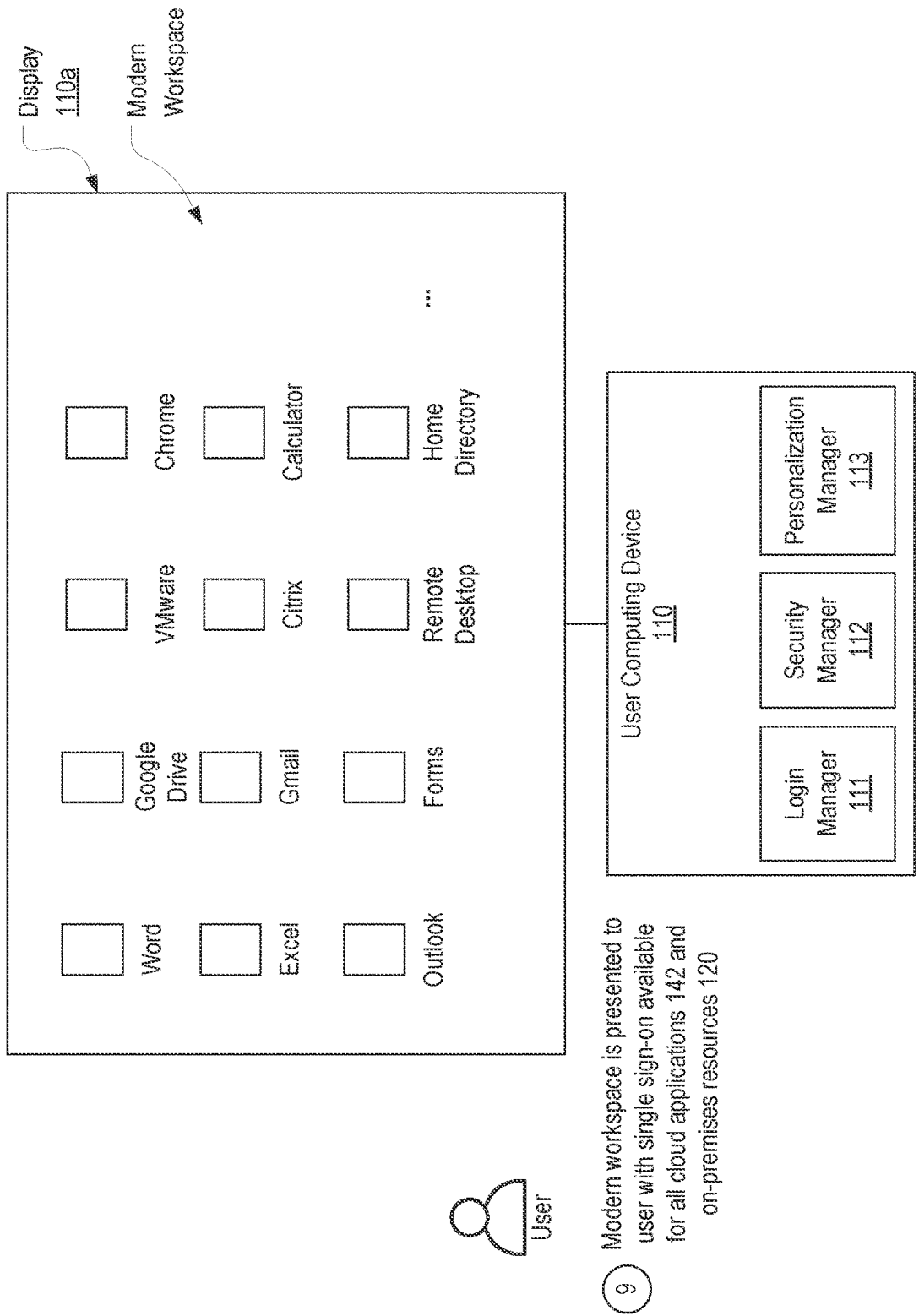

Turning to FIG. 2I, in step 9, the modern workspace is presented to the user with single sign-on available for all cloud applications 142 and on-premises resources 120 presented in the modern workspace. In the depicted example, the modern workspace includes Word, Excel and Outlook from Microsoft 365, Google Drive, Gmail, and Forms from Google Workspace, VMware, Citrix, and Remote Desktop for accessing applications via a virtual desktop infrastructure, Chrome and Calculator as local resources, and the home directory. Because of the authentication that login manager 111 has performed, when the user selects any of these resources available in the modern workspace, single sign-on can be implemented to log the user in to the resource. For example, if the user selects Google Drive, the user can be automatically logged in as a result of the authentication that login manager 111 initiated using the login credentials received via the custom login screen (e.g., using tokens obtained from the authentication and stored by security manager 112).

In summary, the functionality that login manager 111 performs allows the user to log in to a modern workspace using any cloud identity provider rather than Active Directory or other local domain service. This login to the modern workspace without being joined to Active Directory encompasses logging in to cloud applications 142 and on-premises resources 120 using single sign-on techniques. As a result, an enterprise can provide modern workspaces to its users without the need to invest in the hardware and expertise for hosting Active Directory or other domain services on-premises. These benefits are provided regardless of the operating system or cloud identity provider that may be used.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for logging in to modern workspaces using different cloud identity providers and single sign-on, the method comprising:
   in conjunction with a user computing device booting up and prior to a user logging in to the user computing device, detecting that the user is attempting to log in to the user computing device;
   presenting a custom login screen to the user to thereby prevent the user from logging in to the user computing device using a login screen provided by an operating system that has been loaded on the user computing device;
   receiving login credentials via the custom login screen;
   injecting the login credentials into an authentication interface of a cloud identity provider to thereby authenticate the user via the cloud identity provider using the login credentials received via the custom login screen; and
   in response to authenticating the user using the login credentials received via the custom login screen, causing the user to be logged in to the user computing device, wherein causing the user to be logged in to the user computing device comprises presenting a modern workspace to the user on the user computing device in place of allowing the operating system to present a desktop to the user, wherein the modern workspace includes cloud resources from a variety of cloud solutions.

2. The method of claim 1, further comprising:
   leveraging the authentication of the user via the cloud identity provider to perform single sign-on for one or more of the cloud resources available in the modern workspace.

3. The method of claim 1, further comprising:
   using the login credentials received via the custom login screen to perform single sign-on for one or more on-premises resources.

4. The method of claim 1, further comprising:
   selecting the cloud identity provider from a plurality of available cloud identity providers.

5. The method of claim 4, wherein the cloud identity provider is selected based on login configurations received from a management server.

6. The method of claim 1, wherein the authentication interface is a webapp.

7. The method of claim 1, further comprising:
   storing one or more tokens obtained via the authentication of the user via the cloud identity provider; and
   using the one or more tokens to perform single sign-on to one or more cloud applications of the cloud resources included in the modern workspace.

8. The method of claim 1, further comprising:
   storing a hash of a password included in the login credentials; and
   using the hash of the password to authenticate the user when the user subsequently attempts to log in to the user computing device.

9. The method of claim 1, further comprising:
   creating a home directory for the user; and
   including the home directory in the modern workspace.

10. The method of claim 1, wherein the modern workspace is deployed using modern workspace configurations received from a management server.

11. One or more computer storage media storing computer executable instructions which when executed implement a method for logging in to modern workspaces using different cloud identity providers and single sign-on, the method comprising:
   receiving, at a login manager on a first user computing device, first login configurations;
   in conjunction with the first user computing device booting up and in response to a first user's attempt to log in to the first user computing device, presenting a first custom login screen to the first user to thereby prevent the first user from logging in to the first user computing device using a login screen provided by an operating system that has been loaded on the first user computing device;
   receiving login credentials for the first user via the first custom login screen;
   selecting a first authentication interface of a first cloud identity provider based on the first login configurations;
   injecting the login credentials for the first user into the first authentication interface to thereby authenticate the first user via the first cloud identity provider using the login credentials for the first user received via the first custom login screen;
   in response to authenticating the first user using the login credentials received via the first custom login screen, causing the first user to be logged in to the first user computing device, wherein causing the first user to be logged in to the first user computing device comprises, presenting a first modern workspace to the first user on the first user computing device in place of allowing the operating system to present a desktop to the first user, wherein the first modern workspace includes cloud resources from a variety of cloud solutions;

receiving, at a login manager on a second user computing device, second login configurations;

in conjunction with the second user computing device booting up and in response to a second user's attempt to log in to the second user computing device, presenting a second custom login screen to the second user to thereby prevent the second user from logging in to the second user computing device using a login screen provided by an operating system that has been loaded on the second user computing device;

receiving login credentials for the second user via the second custom login screen;

selecting a second authentication interface of a second cloud identity provider based on the second login configurations, the second cloud identity provider being different from the first cloud identity provider;

injecting the login credentials for the second user into the second authentication interface to thereby authenticate the second user via the second cloud identity provider using the login credentials for the second user received via the second custom login screen; and in response to authenticating the second user using the login credentials received via the second custom login screen, causing the second user to be logged in to the second user computing device, wherein causing the second user to be logged in to the second user computing device comprises, presenting a second modern workspace to the second user on the second user computing device in place of allowing the operating system to present a desktop to the second user, wherein the second modern workspace includes cloud resources from a variety of cloud solutions.

12. The computer storage media of claim 11, wherein the method further comprises:

leveraging the authentication of the first user via the first cloud identity provider to perform single sign-on for one or more of the cloud resources available in the first modern workspace; and leveraging the authentication of the second user via the second cloud identity provider to perform single sign-on for one or more of the cloud resources available in the second modern workspace.

13. The computer storage media of claim 11, wherein the method further comprises:

using the login credentials for the first user received via the first custom login screen to perform single sign-on for one or more on-premises resources available in the first modern workspace; and using the login credentials for the second user received via the second custom login screen to perform single sign-on for one or more on-premises resources available in the second modern workspace.

14. The computer storage media of claim 11, wherein the first authentication interface is a first webapp and the second authentication interface is a second webapp.

15. The computer storage media of claim 11, wherein the method further comprises:

storing a first hash of a password included in the first login credentials;

using the first hash to authenticate the first user when the first user subsequently attempts to log in to the first user computing device;

storing a second hash of a password included in the second login credentials;

using the second hash to authenticate the second user when the second user subsequently attempts to log in to the second user computing device.

16. The computer storage media of claim 11, wherein the method further comprises:

creating a first home directory for the first user;

including the first home directory in the first modern workspace; and creating a second home directory for the second user; and including the second home directory in the second modern workspace.

17. A user computing device comprising:

one or more processors; and computer storage media storing computer executable instructions which when executed implement a login manager that is configured to perform a method for logging a user into a modern workspace using a cloud identity provider and single sign-on, the method comprising:

in conjunction with the user computing device booting up and prior to a user logging in to the user computing device, detecting that the user is attempting to log in to the user computing device;

presenting a custom login screen to the user to thereby prevent the user from logging in to the user computing device using a login screen provided by an operating system that has been loaded on the user computing device;

receiving login credentials via the custom login screen;

injecting the login credentials into an authentication interface of a cloud identity provider to thereby authenticate the user via the cloud identity provider using the login credentials received via the custom login screen; and in response to authenticating the user using the login credentials received via the custom login screen, causing the user to be logged in to the user computing device, wherein causing the user to be logged in to the user computing device comprises, causing a modern workspace to be presented to the user on the user computing device in place of allowing the operating system to present a desktop to the user, wherein the modern workspace includes cloud resources from a variety of cloud solutions.

18. The user computing device of claim 17, wherein the method performed by the login manager further comprises:

leveraging the authentication of the user via the cloud identity provider to perform single sign-on for one or more of the cloud resources available in the modern workspace.

19. The user computing device of claim 17, wherein the method performed by the login manager further comprises:

using the login credentials received via the custom login screen to perform single sign-on for one or more on-premises resources.

20. The user computing device of claim 17, wherein the method performed by the login manager further comprises:

selecting the cloud identity provider from a plurality of available cloud identity providers based on login configurations received from a management server.

* * * * *